Dec. 31, 1963 W. P. MARGOPOULOS 3,116,458

PEAK SENSING SYSTEM EMPLOYING SAMPLING AND LOGIC CIRCUITS
CONVERTING ANALOG INPUT TO POLARITY-INDICATING
DIGITAL OUTPUT

Filed Dec. 21, 1959 5 Sheets-Sheet 1

(PEAK SENSING SYSTEM)

(SAMPLE-HOLD CIRCUIT)

INVENTOR
WILLIAM P. MARGOPOULOS

BY
SUGHRUE, ROTHWELL, MION AND ZINN
ATTORNEYS

Dec. 31, 1963 W. P. MARGOPOULOS 3,116,458

PEAK SENSING SYSTEM EMPLOYING SAMPLING AND LOGIC CIRCUITS CONVERTING ANALOG INPUT TO POLARITY-INDICATING DIGITAL OUTPUT

Filed Dec. 21, 1959 5 Sheets-Sheet 2

(PEAK SENSING SYSTEM COMPARATOR)

(TIMING CHART)

(PEAK SENSING SYSTEM)

United States Patent Office 3,116,458
Patented Dec. 31, 1963

3,116,458

PEAK SENSING SYSTEM EMPLOYING SAMPLING AND LOGIC CIRCUITS CONVERTING ANALOG INPUT TO POLARITY-INDICATING DIGITAL OUTPUT

William P. Margopoulos, Poughkeepsie, N.Y., assignor to International Business Machines Corporation, New York, N.Y., a corporation of New York Filed Dec. 21, 1959, Ser. No. 860,930
5 Claims. (Cl. 328—135)

This invention relates to a peak sensing system and more particularly to a system for detecting and indicating peaks of both positive and negative polarity occurring in a waveform; i.e., the reversal of slope of a waveform.

In many electronic applications it is necessary to determine as accurately as possible the time of occurrence and the amplitude of positive or negative peaks occurring in an input waveform. For the purpose of future discussions positive peaks will be identified as peaks and negative peaks will be identified as valleys. The present invention provides a system for accurately determining the occurrence of these peaks and valleys and the amplitudes thereof by comparing a first amplitude value of said waveform with a second amplitude value thereof obtained and stored earlier in time. If the comparison indicates that the first valve is greater than the second valve the input waveform is increasing in amplitude. If the opposite is indicated then the input waveform is decreasing in amplitude. Means are provided in accordance with the present invention to provide an indication of when the above two comparisons switch. For instance in the first comparison with the input waveform increasing in amplitude the first value exceeds the second value. However, when the comparisons switch by which the second value exceeds the first value the present system provides an indication thereof. This indicates a peak has been achieved in the waveform. As long as the second amplitude value exceeds the first amplitude value then of course the amplitude of the input waveform is decreasing. Whenever, however, this comparison switches and the second amplitude becomes less than the first amplitude this switch is indicated by the present system to indicate that a valley has been achieved in the input waveform.

It is therefore an object of this invention to provide a system for detecting and indicating the occurrence of peaks and valleys in an input waveform.

It is a further object of this invention to provide means for indicating the amplitudes of the peaks and valleys so detected.

Other and further objects of the present invention may become apparent from a detailed description of the accompanying drawings.

Figure 1:
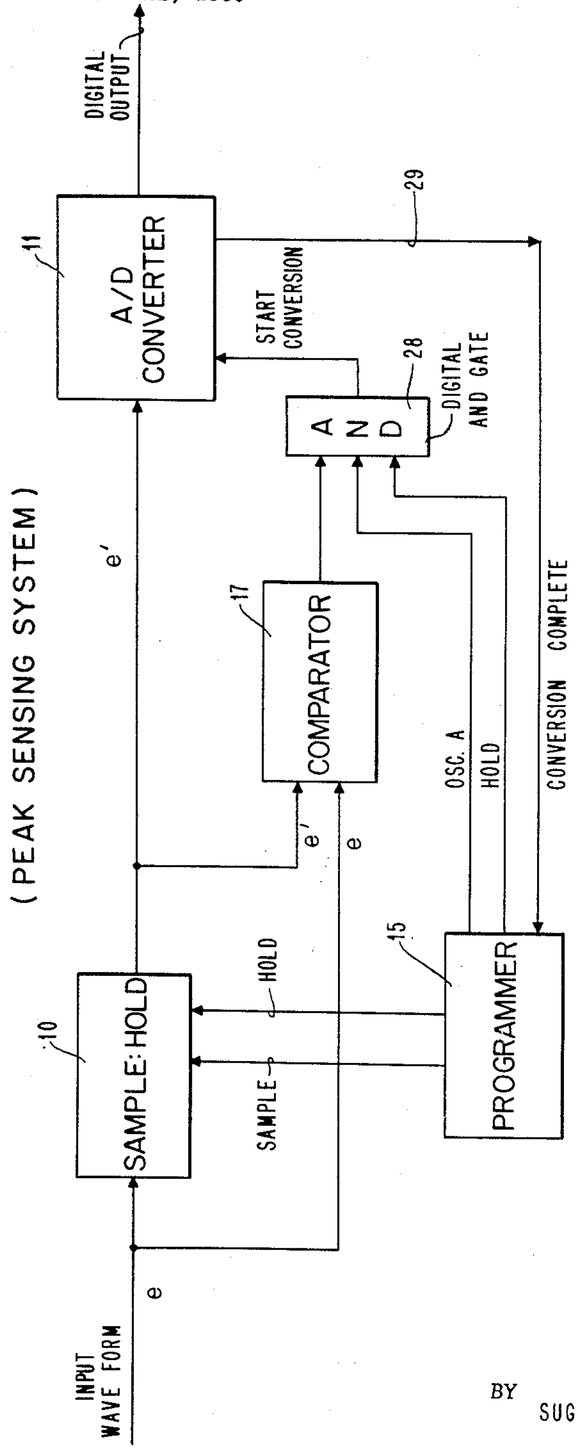
FIG. 1 is a diagrammatic illustration of one embodiment of the peak sensing system constructed in accordance with this invention.
Figure 2:
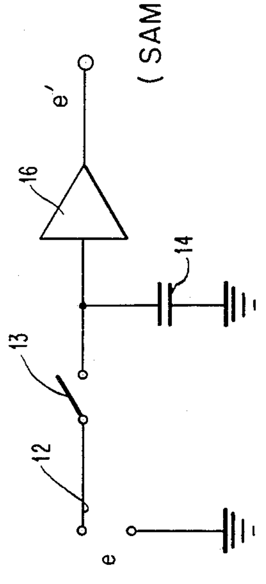
FIG. 2 is a diagrammatic representation of a sample-hold circuit which may be employed in accordance with the present invention.

The peak sensing system is shown diagrammatically in FIGURE 1. The input waveform $e$ is applied to the sample-hold circuit indicated at 10. This circuit functions to store the amplitude of the input waveform $e$ during sample time and to hold during hold time the last amplitude sampled. Its output is fed to the analog-digital converter 11. A typical circuit that can be employed for this sample-hold circuit is shown in FIGURE 2. The input waveform $e$ is applied between ground and the line 12. During sample time the switch 13 is effectively closed. This permits the charging of capacitor 14 as a function of the input waveform $e$. The switch 13 may conveniently be an electromechanical relay which is closed during sample time and open during hold time. The operation of this relay can be controlled by some high speed switching device which functions in connection with hold and sample pulses which are generated by the programmer 15 shown in FIGURE 1. High speed switching, however, is more conveniently obtained by an electronic switch under the control of the sample and hold pulses. An amplifier 16, as shown in FIGURE 2, amplifies the input thereto from the condenser 14 and provides an output to the converter 11 shown in FIGURE 1. The amplification preferably is only such as to make $e=e'$ during sampling time.

It can be seen then in connection with FIGURE 1 that the input waveform is fed to the sample-hold circuit 10 and also to the comparator 17. The output of the amplifier 16 in the sample-hold circuit is also fed to the comparator 17 and is here identified as $e'$. The details of one type of comparator that may be employed in accordance with this invention are shown in FIGURE 3.

Figure 3:
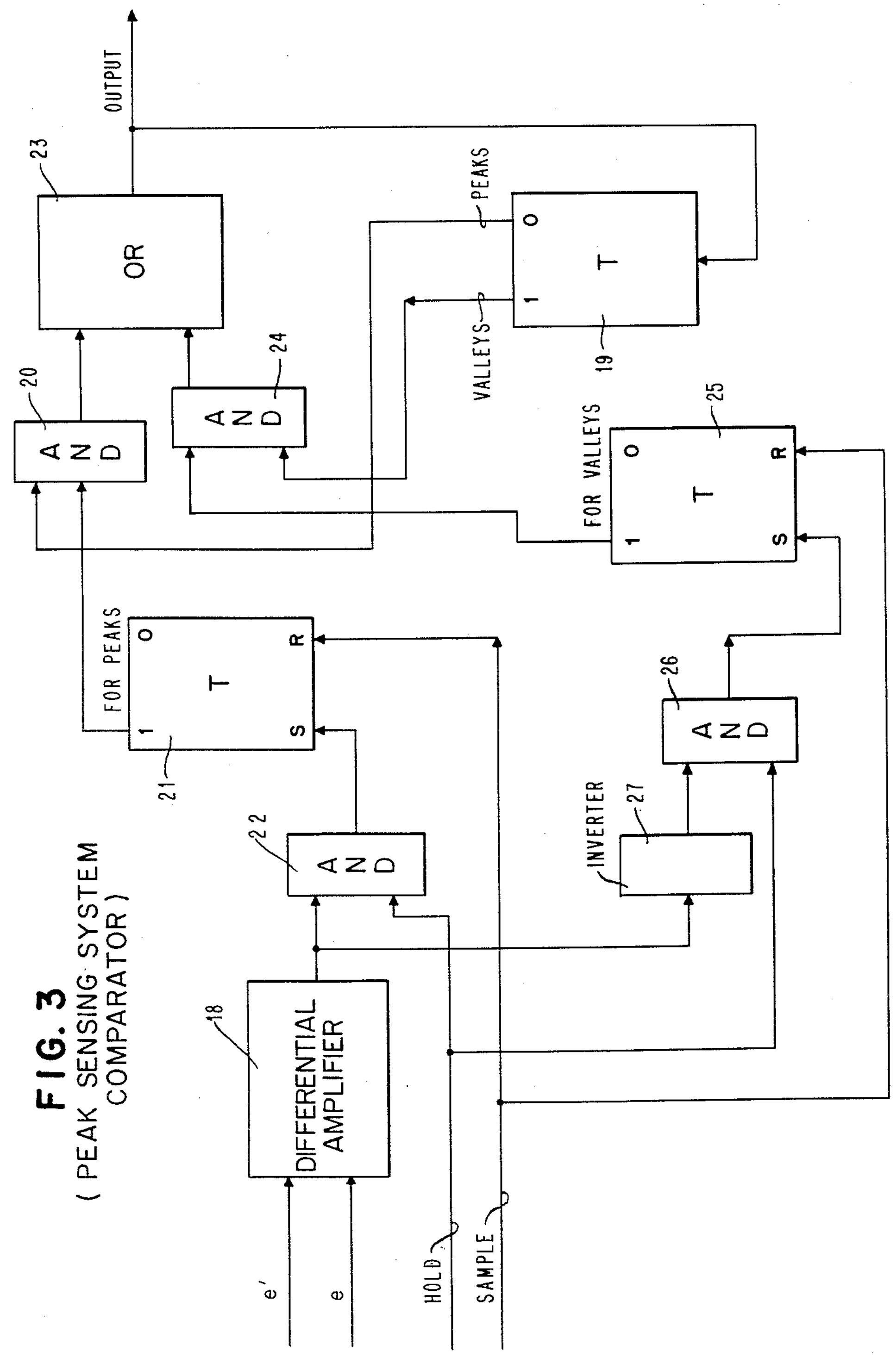
FIG. 3 is a diagrammatic illustration of a peak sensing system comparator which may be used in accordance with this invention.

Referring now to FIGURE 3, a comparing means in the form of a differential amplifier 18 of a conventional type provides an output which is a function of the difference between $e'$ and $e$. It is assumed here that there will be a positive output if $e'$ is greater than $e$ and a negative output whenever $e$ is greater than $e'$. For the purpose of initiating the discussion of this comparator, it is assumed that the binary trigger 19 is in the reset condition providing an up level at its 0 output to AND gate 20. Consequently, AND gate 20 will provide an output therefrom only when trigger 21 is in the SET condition. It can be placed in the SET condition by the unblocking of AND gate 22. AND gate 22 is unblocked at HOLD time provided $e'$ is greater than $e$. This is the circumstance reached when a peak is obtained in the input waveform. In this event, AND gate 20 is unblocked to provide an output from OR gate 23 which function as the comparator output. The output from OR gate 23 is also fed back to the binary trigger 19, to both the set and the reset inputs thereof and under the conditions of the present discussion will set binary trigger 19 so that its 1 output goes up. This then will block AND gate 20 and will condition AND gate 24. The duration of the output obtained from OR gate 23 is a function of the switching time of the binary trigger 19. With binary trigger 19 now in the SET condition and AND gate 24 conditioned, a comparator output from OR gate 23 is obtained whenever trigger 25 is switched to its SET condition. This comes about when AND gate 26 is unblocked. This is done at HOLD time by the output of inverter 27 provided the output of the differential amplifier is negative. This is the case whenever $e$ is greater than $e'$. When this condition prevails, having just previously detected a peak, then the input waveform has reached a valley.

Referring then again to FIGURE 1, the output of the comparator is fed to AND gate 28. This AND gate is unblocked by an output from the comparator 17, the A phase output from an oscillator, which later will be described, at HOLD time. The unblocking of AND gate 28 provides a start conversion signal to the analog-to-digital converter 11 to initiate an operation thereof. At each operation of the converter 11 its digital output represents the amplitude either of a peak or a valley of the input waveform. This converter can be of a conventional form. Upon the completion of the conversion, a conversion complete signal is fed back on line 29 to the programmer 15.

Figure 4:
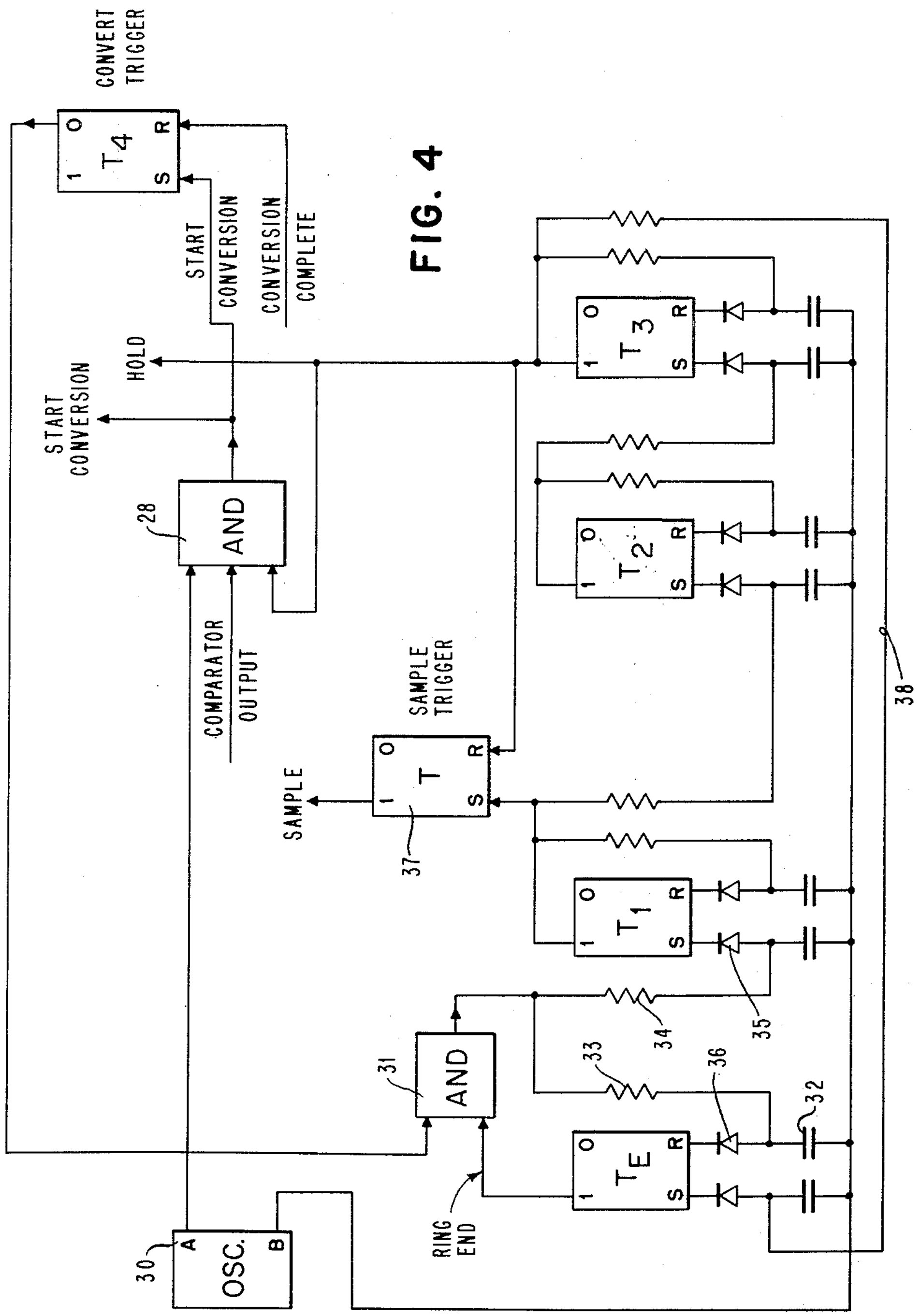
FIG. 4 is a diagrammatic illustration of a programmer which may be employed in accordance with the present invention.

For the details of a suitable programmer which may be used in connection with this invention, reference is now made to FIGURE 4.

Figure 5:
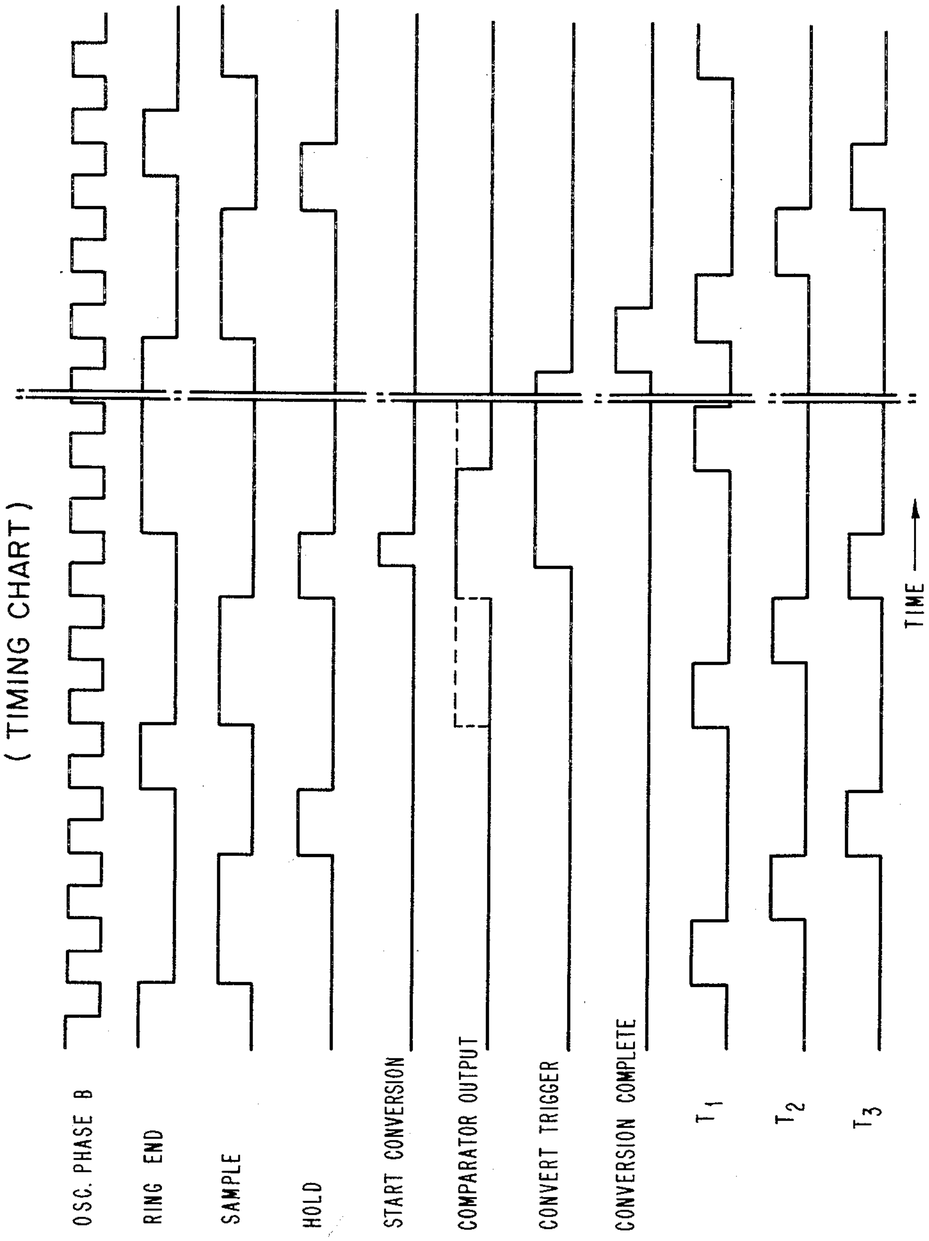
FIG. 5 is a timing chart showing the relationship between the various signals employed in the circuitry of the present invention.

Referring to FIGURE 4, there is shown the programmer for the peak sensing system of the present invention. The operation of this programmer should be viewed for timing purposes in relation to the timing chart shown in FIGURE 5. An oscillator 30 provides A and B complementary phase pulses at the A and B outputs thereof. The timing chart in FIGURE 5 shows the oscillator phase B output. A ring counter comprising four bistable devices is provided and these devices are identified as $T_e$, $T_1$, $T_2$, and $T_3$. $T_e$ is the ring end trigger and it is assumed to be in the SET condition. With trigger $T_e$ set, AND gate 31 is unblocked to provide an up level output through resistors 33 and 34 to the plates of the diodes 35 and 36 to condition these diodes. The positive-going swing of the B phase pulses from the B phase pulse switch is applied to all of the inputs to each of the four triggers finds only the diodes 35 and 36 conditioned. Consequently, trigger $T_e$ is reset and trigger $T_1$ is set. Of course the resetting of trigger $T_e$ will block AND gate 31. It can be seen then that the trigger is advanced by the positive-going leading edges of the B phase pulses from the oscillator 30. When trigger $T_1$ is set, its 1 output goes up to set the sample trigger 37 to provide at the 1 output thereof the sample pulse which is shown also in FIGURE 5. The sample pulse will stay up until trigger $T_3$ is set. The 1 output of $T_3$ is connected to the RESET input of the sample trigger 37. When $T_3$ is turned ON and the sample trigger is reset to bring the sample line down, the HOLD line goes up. It will stay up until the next positive swing of the B phase pulses from the oscillator 30. Feedback from $T_3$ to $T_e$ is obtained via line 38. The AND gate 28 of FIGURE 1 is shown similarly marked in this FIGURE 4. This AND gate is sampled by the A phase pulses from the oscillator 30. Provided there is a comparator output, AND gate 28 is unblocked to provide the start conversion signal to the analog-to-digital converter. Also, the start conversion pulse sets the convert trigger $T_4$. The RESET output of the convert trigger $T_4$ is coupled back to AND gate 31. When it is set this will block AND gate 31 and prevent further advancement of the ring until a conversion complete pulse again resets convert trigger $T_4$. This provides time for the analog-to-digital converter to provide the digital output significant of either a peak or a valley in the input waveform and more particularly an indication of the amplitude thereof. It should be noted that the means of controlling the switch 13 in FIGURE 2 is a binary device and consequently when it is placed in the HOLD condition to open switch 13, it will remain in this condition until the sample pulse comes along to trigger it back to the sample condition, in which case the switch 13 is again closed.

Referring back to FIGURE 3 for a moment, it may be that a comparator output is only necessary for peaks or for valleys and not for both. In this particular case then, the output of trigger 21 can be employed for peak indications and the output of trigger 25 can be used for valley indications.

Figure 6:
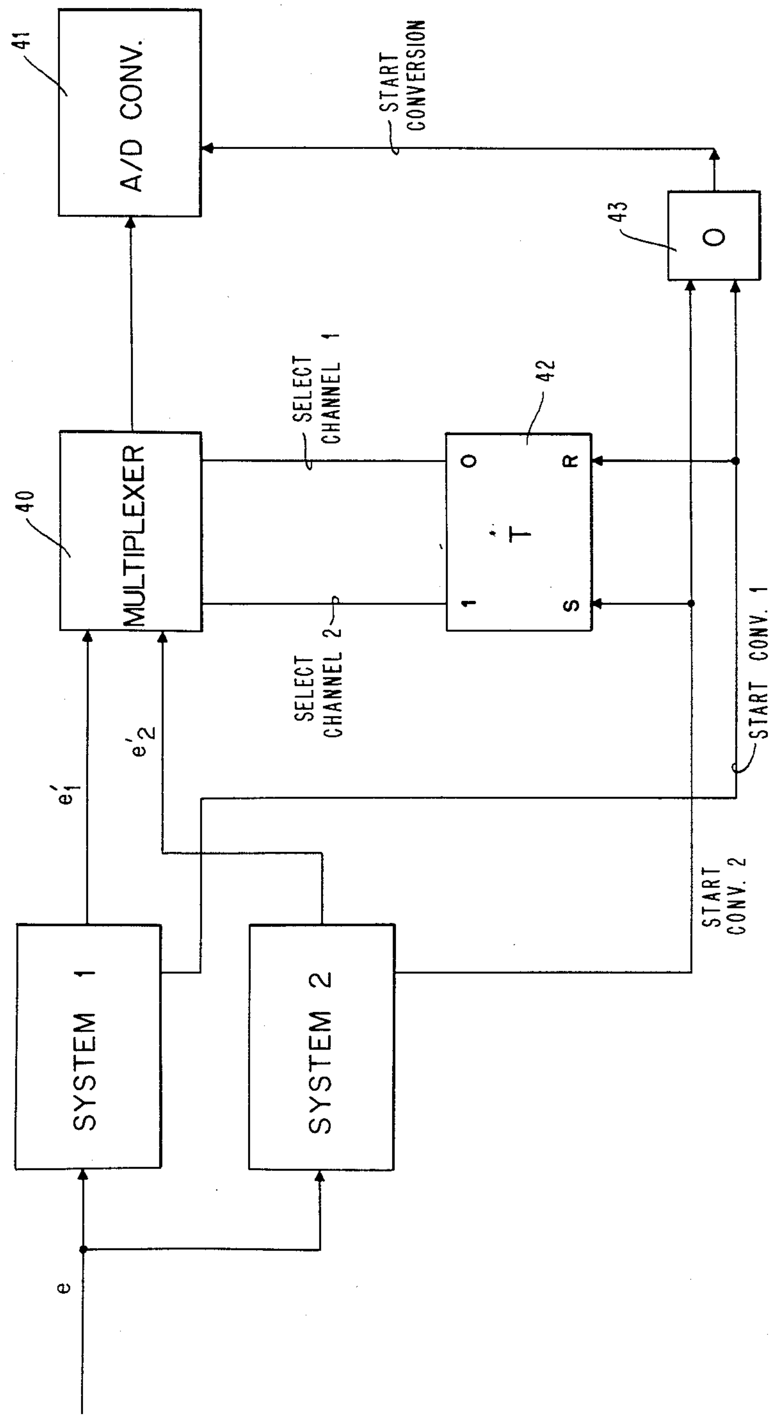
FIG. 6 is another embodiment of a peak sensing system constructed in accordance with the present invention.

Referring now to FIG. 6, there is shown a peak sensing system constructed in accordance with the present invention which may be employed for a more accurate determination of the occurrence of peaks and valleys. This is achieved by increasing the frequency of sampling of the input waveform to obtain more close control of comparator output. Two systems similar to the system previously described herein may be employed and the two comparator outputs identified here as $e'_1$ and $e'_2$ may be fed to a multiplexer 40. This multiplexer has two channels identified as channel 1 and channel 2. Channel 1, when it is established, connects $e'_1$ to the analog-to-digital converter 41. Channel 2 when it is established connects $e'_2$ to the analog-to-digital converter. When system 1 provides the start conversion 1 pulse, this pulse is applied to the RESET input to trigger 42. This brings the 0 output of trigger 42 up to select channel 1. Also this will through OR gate 43 provide the start conversion signal to the converter 41. When system 2 provides the start conversion 2 signal to the SET input to trigger 42 this brings the 1 output up to select channel 2 in the multiplexer.

It has been found that with the use of one system of the present type with a sampling repetition rate of 15 microseconds, accuracy of within 1% of the true peak value of $e$ can be obtained for a frequency range of about 463 cycles per second to about 2,920 cycles per second. To increase the over-all band width with the same order of accuracy another system working in parallel with this 15-microsecond system but having a sampling rate in the order of 40 microseconds may be used with the multiplexer. Such a dual system is shown in FIG. 6.

What has been shown and described are various embodiments of the present invention. Other embodiments obvious from the teachings herein to those skilled in the art are contemplated to be within the spirit and scope of the following claims.

What is claimed is:

1. In a system for alternately indicating the amplitude of peaks and valleys of a waveform, a sample-hold circuit; programming means for establishing alternating sample time periods and hold time periods; switching means controlled by said programming means to feed said waveform to said circuit only during the sample time periods, whereby said circuit follows said waveform during each sample time period and holds, during each hold time period, the value of the waveform at the end of the preceding sample time period; comparing means having two input means; means to feed, as inputs to said input means, said waveform and the output of said circuit, respectively; said comparing means being adapted to produce an output of one polarity when one of said inputs exceeds the other and an output of opposite polarity when the other of said inputs exceeds the one; indicating means coupled to said circuit; and means for initiating an operation of said indicating means upon each reversal of polarity of the output of said comparing means, so as to indicate, alternately, the peaks and valleys of said waveform.

2. A system as defined in claim 1, wherein said initiating means is settable to either of two conditions, in one of which it is responsive only to outputs from said comparing means of one polarity and in the other of which it is responsive only to outputs from said comparing means of the opposite polarity, and means operable upon each operation of said indicating means for setting said initiating means alternately in said two conditions.

3. A system as defined in claim 2, wherein said initiating means comprises two branches each including control means, said control means being respectively responsive only to outputs of opposite polarities from said comparing means, said control means being coupled to said setting means so as to be alternately rendered effective thereby.

4. A system as defined in claim 1, wherein said initiating means includes two bistable devices, each having set and reset means; one of said bistable devices being responsive to outputs from said comparing means of one polarity, the other bistable device being responsive to outputs from said comparing means of the opposite polarity; and means controlled by said programming means for transmitting reset signals to the reset means of said bistable devices at sample time and for conditioning the set means of said bistable devices to be receptive to outputs from said comparing means during hold time only.

5. A system as claimed in claim 1 wherein said programming means includes a ring counter, means to advance said counter, a sample bi-stable device for generating a sample signal to determine said sample time period, means connecting said sample bistable device to two stages of said ring to control the operation of said sample bistable device by the advancement of said ring, and means connected to at least one of said two stages to generate a hold signal to determine said hold time period.

References Cited in the file of this patent

UNITED STATES PATENTS

| | | |
|---|---|---|
| 2,774,535 | Anderson | Dec. 18, 1956 |
| 2,834,883 | Lukoff | May 13, 1958 |
| 2,840,707 | Johnson | June 24, 1958 |
| 2,845,597 | Perkins | July 29, 1958 |
| 2,896,078 | Moore | July 21, 1959 |
| 2,933,689 | Johnson | Apr. 19, 1960 |
| 3,017,521 | Herstedt | Jan. 16, 1962 |

FOREIGN PATENTS

| | | |
|---|---|---|
| 565,461 | Great Britain | Nov. 10, 1944 |